May 22, 1945.  A. M. ROSSMAN  2,376,452
EASEL
Filed Aug. 6, 1943
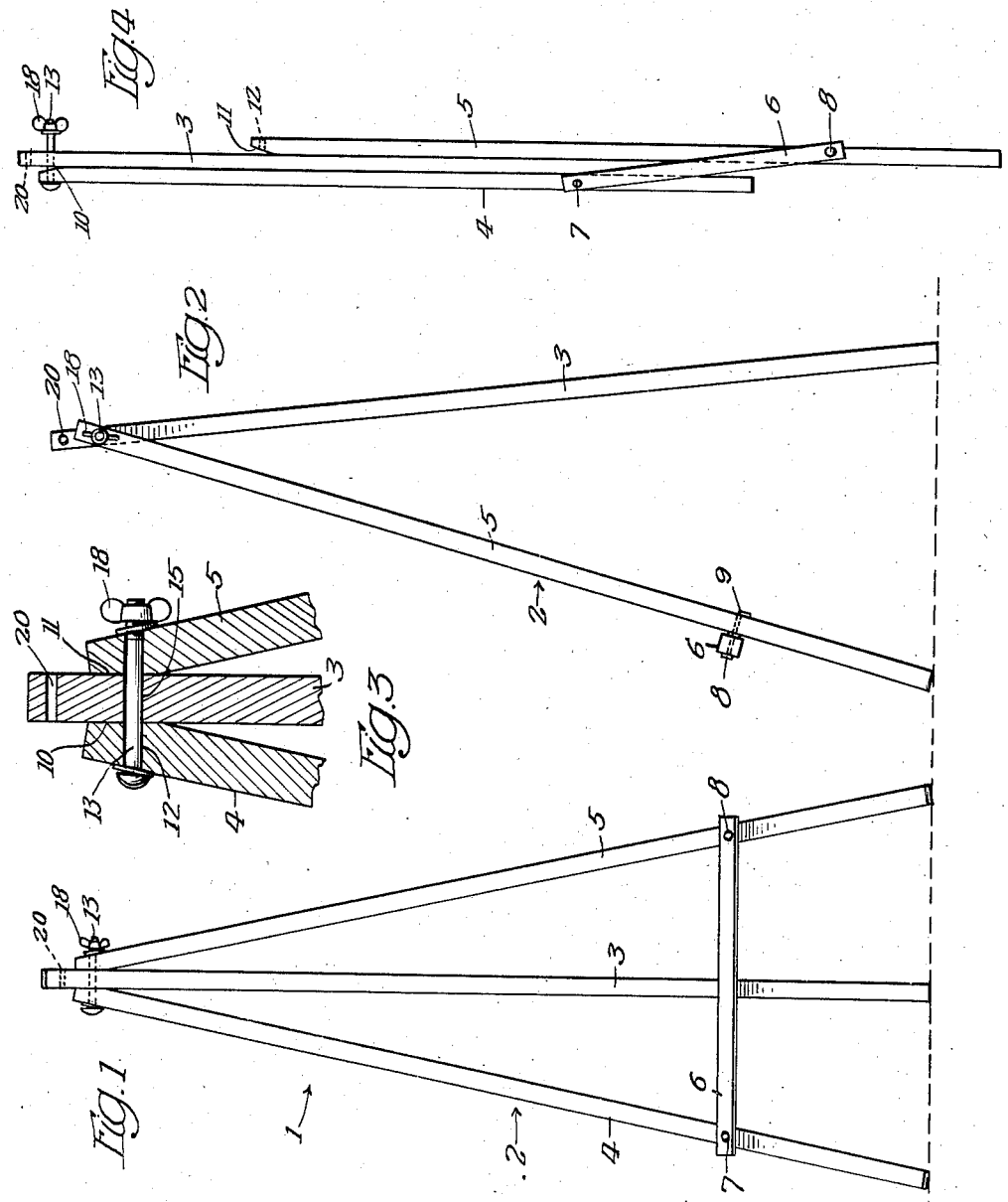
Inventor
Allan M. Rossman
By Morris Spector
Atty Patented May 22, 1945

2,376,452

UNITED STATES PATENT OFFICE 2,376,452

EASEL

Allen M. Rossman, Wilmette, Ill.

Application August 6, 1943, Serial No. 497,699

2 Claims. (Cl. 248—197)

This invention relates to easels, more particularly easels for supporting an article in an inclined position, such as for holding floral displays and the like.

It is one of the objects of the present invention to provide an easel which is simple of construction, sturdy, and which may be collapsed into compact form for shipment or storage and yet may be quickly and readily reassembled for use.

It is a further object of the present invention to provide an easel of the above mentioned character which requires a minimum amount of metal or metal parts.

It is a still further object of the present invention to provide an easel of the above mentioned character which includes a front frame and a pivoted supporting leg so arranged that the leg may be set at any desired angle, within limits, to the supporting frame thereby to position the supporting frame at various desired angles to the horizontal.

The attainment of the above and further objects of the present invention will be apparent from the following specification taken in conjunction with the accompanying drawing forming a part thereof.

In the drawing:

Figure 1 is a front view of the easel of the present invention;

Figure 2 is a side view thereof;

Figure 3 is an enlarged fragmentary sectional view of the top portion of the easel; and Figure 4 is a view of the easel collapsed for shipment or storage.

Reference may now be had more particularly to the drawing, wherein like reference numerals indicate like parts throughout.

The easel, indicated in general by the reference numeral 1, is made of wood and includes a front supporting frame 2 of a generally A-shape and a rear pivoted supporting leg 3. The A-frame includes two legs 4 and 5 joined by a wood cross rod 6 that is nailed to the legs 4 and 5 by nails 7 and 8. Each of the nails extends through drilled holes in the cross rod 6 and the legs 4 and 5. Each nail is clinched over at the bottom, as indicated at 9. The legs 3, 4 and 5 are of the same lengths and are rectangular in cross section. The top of each leg 4 and 5 is chamfered off, as indicated at 10—11, to form flat surfaces which are parallel to one another and extend in vertical planes when the frame is in the position illustrated in Figures 1 and 2, that is, when both legs of the frame 2 rest upon the horizontal surface. The legs 4 and 5 are of identical construction and each leg has a hole 12 formed therein for receiving a pivot bolt 13. The bolt extends through the legs 4 and 5 and through a hole 15 in the supporting leg 3. One end of the bolt 13 has a head thereon that bears upon the outside of the leg 4. A wing nut 18 threads on the opposite end of the bolt and bears against the leg 5. Metal washers may, optionally, be interposed between the bolt head and the leg 4 and between the wing nut 18 and the leg 5. When the wing nut 18 is loosened on the shank of the bolt 13 the pivot leg 3 may be freely swung between the legs 4—5 of the A-frame 2. When the wing nut is tightened it clamps the bearing surfaces 10—11 of the legs 4—5 firmly against the leg 3 and thus holds the leg 3 in its position of angular adjustment with respect to the frame 2.

The top of the leg 3 has a hole 20 formed therethrough. If desired, a wire or cord may be strung through the hole 20 and used to tie a floral wreath or other object in place on the easel.

If it is desired to collapse the easel the nut 18 may be loosened and the leg 3 may then be swung to lie in the same plane as the A-frame 2 lies, the leg 3 then lying against the back of the cross bar 6. In that position the bottom of the leg 3 is above a line joining the bottoms of the legs 4—5. If the easel is then leaned against a wall it will be supported at its bottom only by the legs 4—5. The easel is then in condition for ready use. The leg 3 may be quickly swung to the position illustrated in Figure 2, and then by tightening the wing nut 18 the upper ends of the legs 4—5, at the apex of the A-frame, are clamped against the opposite surfaces of the pivoted supporting leg 3 and thus hold the supporting leg in position. The chamfered surfaces 10—11 of the frame members 4—5 provide two parallel, plane, continuous bearing surfaces for the opposite plane surfaces of the upper end of the leg member 3. The tightened clamping bolt inhibits any tendency for the leg 3 to be moved in or out from its adjusted position, such as might result from an accidental push or kick against the easel tending to slide it along the floor. The A-frame 2 is sturdy of construction, since the triangle formed by the legs 4—5 and the cross member 6 provides a rigid structure.

The easel may be readily collapsed for shipment. This is done by merely loosening and removing the wing nut 18, then slipping the leg 5 off of the bolt 13, then replacing the wing nut. The three legs 3, 4 and 5 may then be collapsed to the position illustrated in Figure 4 by pivoting the legs 4 and 5 about the nails 7—8 on the cross member 6. The collapsed structure is compact for shipment or storage, and may be very quickly and readily reassembled to form the complete easel.

If desired washers may be interposed between the cross member 6 and the legs 4—5 to entirely prevent rubbing of the exposed surfaces and possible marring of the painted finish of the surfaces as the easel is folded to and from the position of Figure 4. This however, is optional as in most cases there would be substantially no marring of the surfaces, hence the washers around the nails 7—8 between the cross bar 6 and the bars or legs 4—5 may be omitted. When the easel is made of hard wood the nail holes and bolt holes are drilled through the wood before the easel is assembled.

In compliance with the requirements of the patent statutes I have here shown and described a preferred embodiment of my invention. It is, however, to be understood that the invention is not limited to the precise construction here shown, the same being merely illustrative of the principles of the invention. What I consider new and desire to secure by Letters Patent is:

1. An easel for supporting an article in an inclined position, said easel including an A-shaped front frame comprising two rods joined together at the apex of the frame by a bolt and joined intermediate their ends by a cross bar that is pivotally connected to both rods by pins the longitudinal axes of which are fixed with respect to the rods and are at right angles to the rods and at right angles to the bar so that upon separating the rods at the bolt the frame may be collapsed by swinging the rods and the cross bar about their connecting pins to bring the rods together, and a supporting rod pivoted to the apex of the frame by said bolt.

2. An easel for supporting an article in an inclined position, said easel including an A-shaped front frame comprising two rods joined together at the apex of the frame by a bolt and joined intermediate their ends by a cross bar that is pivotally connected to both rods by pins at right angles to the rods and at right angles to the bar so that upon separating the rods at the bolt the frame may be collapsed by swinging the rods and the cross bar about their connecting pins to bring the rods together, a supporting rod pivoted to the apex of the frame by said bolt, said supporting rod extending between the rods of the frame at the apex, the ends of the rods of the A-frame being chamfered at the apex of the frame to form parallel bearing surfaces at right angles to the axis of the bolt, and means including said bolt for clamping the rods of the frame toward the pivoted supporting rod to hold the pivoted supporting rod in adjusted position, said rod extending above the frame and having means at its extended part for facilitating securing of an article upon the easel.

ALLEN M. ROSSMAN.